(12) United States Patent
Naito

(10) Patent No.: US 7,545,336 B2
(45) Date of Patent: *Jun. 9, 2009

(54) CARD TYPE WIRELESS DEVICE, ANTENNA COIL, AND METHOD FOR MANUFACTURING COMMUNICATION MODULE

(75) Inventor: Hiromichi Naito, Okazaki (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 353 days.

This patent is subject to a terminal disclaimer.

(21) Appl. No.: 11/406,351

(22) Filed: Apr. 19, 2006

(65) Prior Publication Data

US 2006/0267853 A1 Nov. 30, 2006

(30) Foreign Application Priority Data

May 31, 2005  (JP)  ............................. 2005-158916

(51) Int. Cl.
*H01Q 7/08* (2006.01)
(52) U.S. Cl. ..................................... 343/788
(58) Field of Classification Search ............... 343/788, 343/895, 702, 866–867, 741–742
See application file for complete search history.

(56) References Cited

U.S. PATENT DOCUMENTS

| | | | |
|---|---|---|---|
| 5,321,240 A | 6/1994 | Takahira et al. | |
| 5,864,323 A | 1/1999 | Berthon | |
| 6,046,584 A | 4/2000 | Nakane et al. | |
| 6,194,893 B1 | 2/2001 | Yokotani et al. | |
| 6,291,990 B1 | 9/2001 | Nakane et al. | |
| 6,452,381 B1 | 9/2002 | Nakatani et al. | |
| 6,924,767 B2 | 8/2005 | Kitahara et al. | |
| 7,050,007 B2 | 5/2006 | Akiho et al. | |
| 7,057,514 B2 * | 6/2006 | Mickle et al. | ............ 340/572.7 |
| 2002/0027531 A1 * | 3/2002 | Brown et al. | ................ 343/895 |
| 2004/0075616 A1 | 4/2004 | Endo et al. | |
| 2004/0085247 A1 * | 5/2004 | Mickle et al. | ................ 343/701 |
| 2005/0024285 A1 | 2/2005 | Kato et al. | |
| 2005/0040997 A1 | 2/2005 | Akiho et al. | |
| 2005/0270249 A1 | 12/2005 | Saegusa et al. | |
| 2006/0267854 A1 | 11/2006 | Naito | |
| 2007/0097011 A1 * | 5/2007 | Saegusa et al. | .............. 343/878 |
| 2008/0121242 A1 * | 5/2008 | Revie et al. | .................. 128/899 |

FOREIGN PATENT DOCUMENTS

| | | |
|---|---|---|
| JP | 2002-271127 | 9/2002 |
| JP | 2004-64193 | 2/2004 |
| JP | 2005-210223 | 8/2005 |

\* cited by examiner

*Primary Examiner*—Huedung Mancuso
(74) *Attorney, Agent, or Firm*—Nixon & Vanderhye PC

(57) ABSTRACT

An antenna coil includes: an air-core type flat coil body; and a coil support member disposed between the coil body and a substrate so that the coil body is supported on a surface of the substrate. The thickness of the coil body is smaller than a radius of a circle, an area of which is equal to an area of a region surrounded with an outline of a projected coil body, the projected coil body provided by projecting the coil body on a projection plane perpendicular to the axial direction of the coil body. The coil support member is made of resin hardened soft magnetic material.

22 Claims, 8 Drawing Sheets

FIG. 2A
FIG. 2D
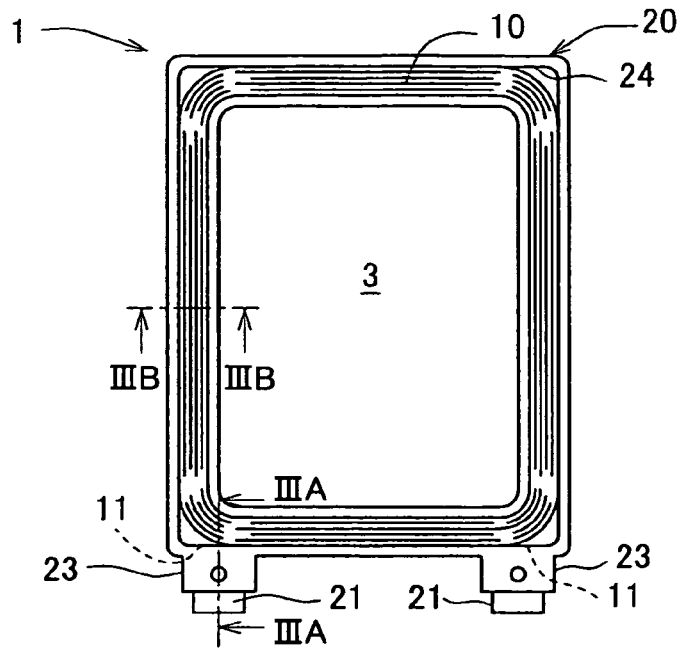
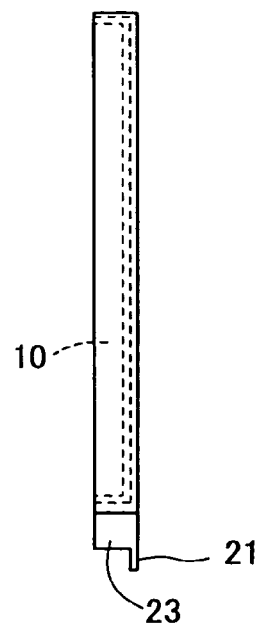
FIG. 2B
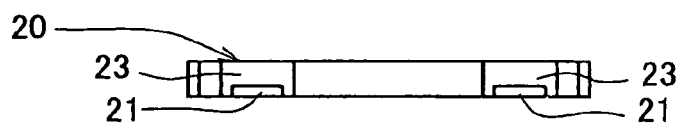
FIG. 2C
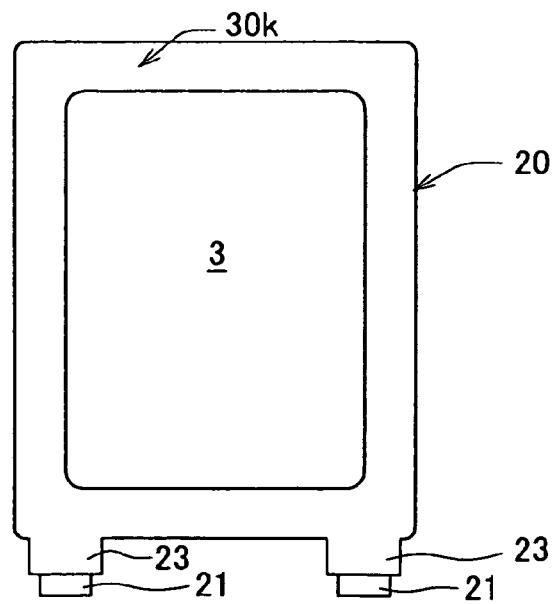

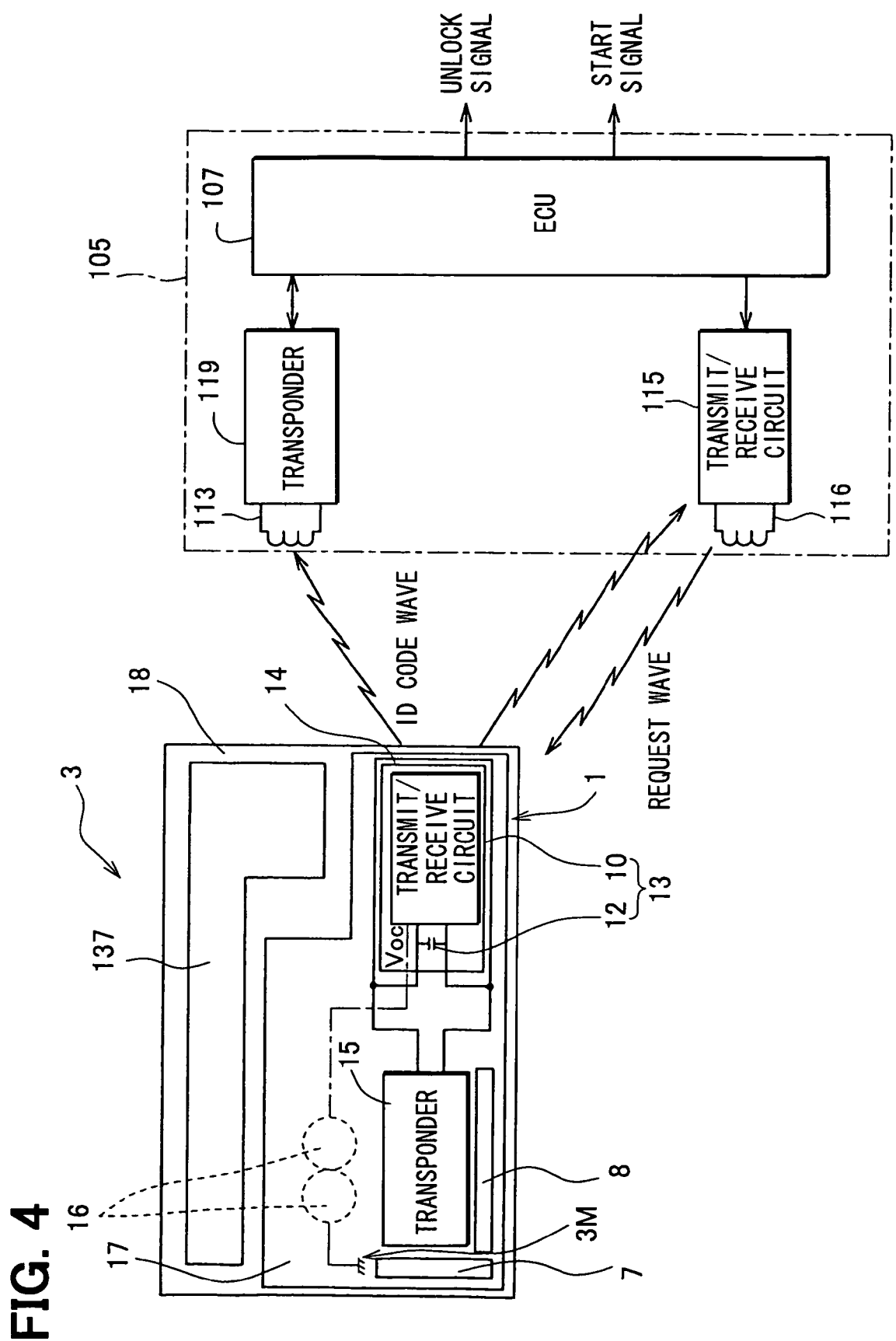

CARD TYPE WIRELESS DEVICE, ANTENNA COIL, AND METHOD FOR MANUFACTURING COMMUNICATION MODULE

CROSS REFERENCE TO RELATED APPLICATION

This application is based on Japanese Patent Application No. 2005-158916 filed on May 31, 2005, the disclosure of which is incorporated herein by reference.

FIELD OF THE INVENTION

The present invention relates to a card type wireless device having a communication module, an antenna coil for the communication module, and a method for manufacturing the communication module.

BACKGROUND OF THE INVENTION

In recent years, an electronic key system (also called a smart entry system, etc.) has spread. In this electronic key system, ID authentication is performed by wireless communication between this system and a wireless electronic key (also called a portable device) carried by a user. Further, controls of locking/unlocking of a door lock, engine starting, etc. can be performed by commands from this portable device. In the above wireless electronic key, a demand for constructing this wireless electronic key as a thin card type wireless device made thin to improve carrying convenience for storing this wireless electronic key into a purse, etc. with a dramatic increased use of an IC card, etc. as background (3 mm or more and 5 mm or less in thickness).

The above electronic key system adopts a communication system able to execute a control operation such as locking/unlocking of the door lock and engine starting if the user approaches the automobile within a predetermined distance even when no user performs a special button operation, etc. with respect to the wireless electronic key. For example, a request radio wave sent out of the automobile side in one direction is received. ID authentication information, control command information relating to the above locking/unlocking or the engine starting, etc. are superposed on the transmitted radio wave and are sent out to the automobile side. In this ease, when the user is distantly located, the wireless electronic key and the automobile do not react on communication. On the other hand, when the user approaches, there are many cases in which near distance type direct communication using a low frequency band (50 kHz or more and 500 KHz or less) is adopted so as to detect the radio wave by detouring the radio wave even when the user holds the wireless electronic key in any portion of the user's body.

The radio wave of the low frequency band has a very long wavelength. Therefore, in an antenna used for this radio wave, a so-called LF (Low Frequency) antenna provided by combining an antenna coil and a capacitor resonantly coupled to this antenna coil in a desirable frequency band is normally adopted. When the LF antenna is assembled into the card type wireless device, it is also necessary to reduce the thickness of this antenna coil in conformity with the thickness of a box body of the card type (e.g., 1 mm or more and 3 mm or less). In this case, it is desirable to mount the antenna coil onto a substrate in a shape for largely setting the aperture diameter of the antenna coil as much as possible to raise sensitivity with respect to the radio wave perpendicularly incident to the substrate face. It is effective to adopt the antenna coil with a core of high inductance so as to raise antenna gain. However, a flat ferrite core is small in mechanical strength, and a crack, a fragment, etc. is easily caused by handling, etc. at coil winding time. Accordingly, an air-core coil is normally adopted.

However, since the coil of an air-core type may have no physical support core, there are defects in that no radio wave magnetic field can be concentrated onto the circumference of the coil and sensitivity and antenna gain are inferior.

SUMMARY OF THE INVENTION

In view of the above-described problem, it is an object of the present invention to provide a card type wireless device having a communication module. It is another object of the present invention to provide an antenna coil having high sensitivity and high antenna gain. It is further another object of the present invention to provide a manufacturing method of a communication module having an antenna coil.

An antenna coil includes: an air-core type flat coil body having a thickness in an axial direction of the coil body; and a coil support member disposed between the coil body and a substrate as a mounting object of the antenna coil so that the coil body is supported on a surface of the substrate. The thickness of the coil body is smaller than a radius of a circle, an area of which is equal to an area of a region surrounded with an outline of a projected coil body, the projected coil body provided by projecting the coil body on a projection plane perpendicular to the axial direction of the coil body. The coil support member is made of resin hardened soft magnetic material.

In the above coil, since the coil support member is made of resin hardened soft magnetic material, the sensitivity and the gain of the antenna coil are improved. This is because the resin hardened soft magnetic material is a ferromagnetic material, and has high magnetic permeability so that magnetic field of an electric wave for participating in transmission/reception of the antenna coil is concentrated. Thus, the antenna coil has high sensitivity and high antenna gain.

Further, a method for manufacturing a communication module having an antenna coil and a transmitting/receiving circuit, which are mounted on a substrate, is provided. The antenna coil is connected to the transmitting/receiving circuit. The method includes the steps of: positioning a coil side terminal of the antenna coil together with a solder member for connecting between a substrate side terminal of the substrate and the coil side terminal of the antenna coil; and heating the substrate together with the antenna coil in a solder reflow furnace so that the solder member is melted and soldered between the coil side terminal and the substrate side terminal. The antenna coil further includes: an air-core type flat coil body having a thickness in an axial direction of the coil body; and a coil support member disposed between the coil body and a substrate as a mounting object of the antenna coil so that the coil body is supported on a surface of the substrate. The thickness of the coil body is smaller than a radius of a circle, an area of which is equal to an area of a region surrounded with an outline of a projected coil body, the projected coil body provided by projecting the coil body on a projection plane perpendicular to the axial direction of the coil body. The coil support member is a coil case having a coil accommodation space for accommodating the coil body therein. The coil case includes a ring shape body corresponding to the coil body, and the coil case includes a part, which is made of the resin hardened soft magnetic material.

In the above communication module, since the coil support member is made of resin hardened soft magnetic material, the sensitivity and the gain of the antenna coil are improved. This is because the resin hardened soft magnetic material is a ferromagnetic material, and has high magnetic permeability so that magnetic field of an electric wave for participating in transmission/reception of the antenna coil is concentrated. Thus, the antenna coil has high sensitivity and high antenna gain.

Further, a card type wireless device includes: a communication module having an antenna coil, a transmitting/receiving circuit connecting to the antenna coil, and a substrate; and a card type casing. The antenna coil includes: an air-core type flat coil body having a thickness in an axial direction of the coil body; and a coil support member disposed between the coil body and a substrate as a mounting object of the antenna coil so that the coil body is supported on a surface of the substrate. The thickness of the coil body is smaller than a radius of a circle, an area of which is equal to an area of a region surrounded with an outline of a projected coil body, the projected coil body provided by projecting the coil body on a projection plane perpendicular the an axial direction of the coil body. The coil support member is made of resin hardened soft magnetic material. The coil body includes an axis, which coincides with a normal line of the substrate. The card type casing accommodates the communication module in such a manner that a thickness direction of the substrate coincides with a thickness direction of the card type casing.

In the above wireless device, since the coil support member is made of resin hardened soft magnetic material, the sensitivity and the gain of the antenna coil are improved. This is because the resin hardened soft magnetic material is a ferromagnetic material, and has high magnetic permeability so that magnetic field of an electric wave for participating in transmission/reception of the antenna coil is concentrated. Thus, the antenna coil has high sensitivity and high antenna gain. Further, the card type wireless device is suitably used for a wireless entry key of an automotive vehicle. Further, the card type wireless device is thin. Therefore, it is preferable to put the card type wireless device into a wallet or the like.

BRIEF DESCRIPTION OF THE DRAWINGS

The above and other objects, features and advantages of the present invention will become more apparent from the following detailed description made with reference to the accompanying drawings. In the drawings:

FIG. 2A is a front view, FIG. 2B is a bottom view, FIG. 2C is a backside view, and FIG. 2D is a side view showing the antenna coil in FIG. 1;

FIG. 4 is a schematic view showing a wireless key system having a card type wireless device;

DETAILED DESCRIPTION OF THE PREFERRED EMBODIMENT

Figure 1:
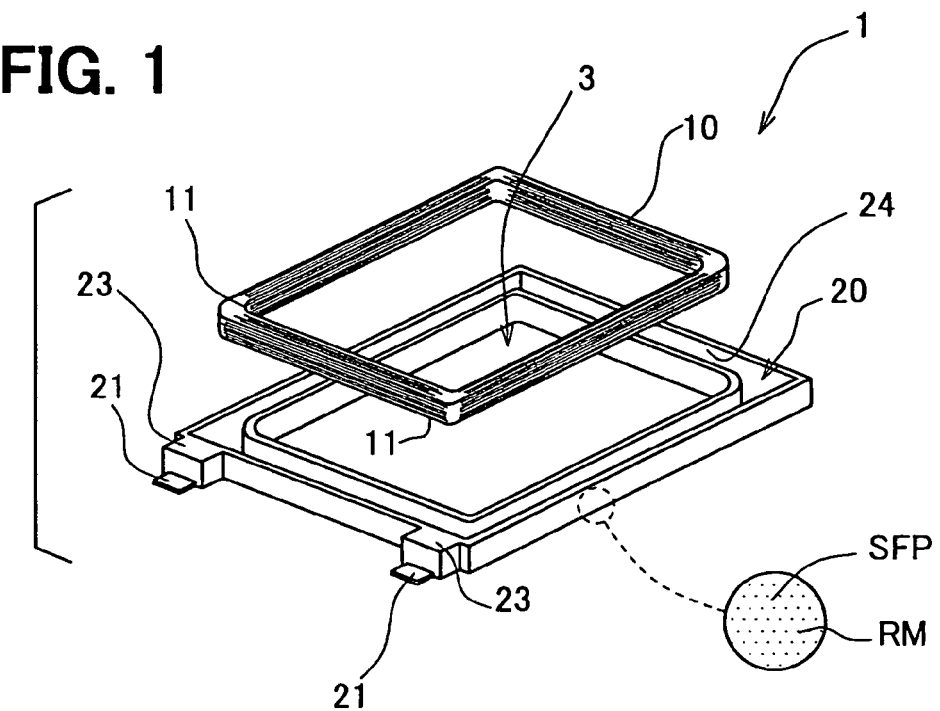
FIG. 1 is an exploded perspective view showing an antenna coil according to an embodiment of the present invention.

FIG. 1 shows an exploded perspective view of an antenna coil 1 as one example of the invention. FIGS. 2A to 2D are four face views (a plan view, a front view, a side view and a bottom view) of the antenna coil 1. The antenna coil 1 has a coil main body 10 of an air-core type of a flat shape, and a coil case 20. The coil case 20 is formed in a ring-shaped mode corresponding to the coil main body 10, and a coil storing portion 24 for storing this coil main body 10 is formed in the circumferential direction.

Figure 3A:
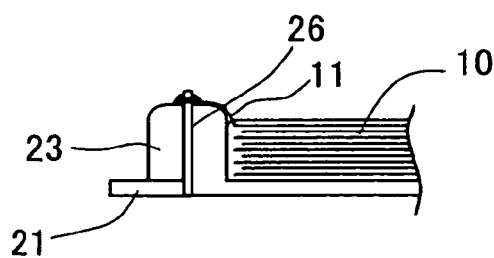
FIG. 3A is a cross sectional view showing the antenna coil taken along line IIIA-IIIA in FIG. 2A.
Figure 3B:
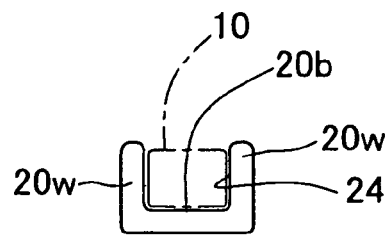
FIG. 3B is a cross sectional view showing the antenna coil taken along line IIIB-IIIB in FIG. 2A.

The coil case 20 functions as a coil support body and is constructed by resin ferrite (resin coupling soft magnetic material) in which soft ferrite powder SFP as soft magnetic material powder is coupled by resin (e.g., PPS resin) RM. The coil case 20 is manufactured by injection molding using a compound formed by kneading the soft ferrite powder and the PPS resin. The coil storing portion 24 is formed in a groove shape opened to one end face in the axial direction of the coil case 20. The entire coil case 20, i.e., all of a bottom portion 20b of the coil storing portion 24 and two side wall portions 20w in FIGS. 3A and 3B are constructed by the resin ferrite. The bottom portion 20b and the two side wall portions 20w, clearly form a ring shape portion of the resin coupling soft magnetic material along the circumferential direction of the coil main body 10. The coil case may be also formed in a bobbin shape in which the coil storing portion is formed in a groove shape along the outer circumferential face.

The thickness of the coil main body 10 in its axial direction is set to be smaller than the radius of a circle of the same area as an area (planar outer shape area) surrounded by a self outer shape line at a projecting time to a projecting face perpendicular to this axis. "The coil main body 10 is formed in the flat shape" is "the thickness of the coil main body 10 in its axial direction is set so as to be smaller than the radius of the circle of the same area as the area (planar outer shape area) surrounded by the self outer shape line at the projecting time to the projecting face perpendicular to this axis." A coil side terminal portion 21 for soldering and mounting the coil main body 10 onto a substrate is arranged in the coil case 20.

Figure 5:
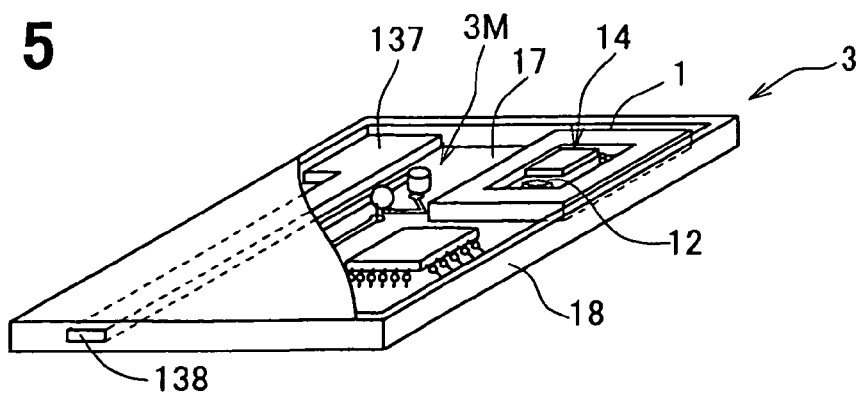
FIG. 5 is a partially cutaway perspective view showing the card type wireless device.

As shown in FIG. 4, the above antenna coil 1 is soldered and mounted to the substrate 17 together with a signal transmitting-receiving circuit 14 connected to this antenna coil 1 in a position relation in which the axis of the coil main body 10 is conformed to the normal direction of the substrate 17. Thus, a communication substrate module 3M is constructed. In this communication substrate module 3M, the antenna coil 1 constitutes an LF antenna 13 together with a capacitor 12 resonantly coupled to this antenna coil 1 in parallel. As shown in FIG. 5, this capacitor 12 and the signal transmitting-receiving circuit (IC) 14 are mounted to a substrate area on the inside of an air gap of the antenna coil 1. Further, a transponder circuit 15 is connected to the above LF antenna in parallel with the signal transmitting-receiving circuit 14. As shown in FIG. 5, the transponder circuit (IC) 15 is mounted to a substrate area outside the antenna coil 1.

As shown in FIGS. 3A and 3B, the coil side terminal portion 21 is set to a terminal pad 21 for performing face-mounting onto the substrate as a mounting destination on the bottom face side of the coil case 20. A solder paste pattern formed by printing, etc. is arranged as the above solder material 135 between the terminal pad 21 and the substrate side pad 134. As shown in FIGS. 2A to 2D, the outer shape lines of the coil main body 10 and the coil case 20 are rectangular shapes, and the terminal pad 21 is arranged in a long side direction end portion of the coil case 20.

The terminal pad 21 can be also arranged on the bottom face of the coil case 20. However, in this case, a lead portion 11 of the coil main body 10 must be connected to a position corresponding to the above terminal pad 21 of the bottom face of the coil storing portion 24 of a narrow width, and an assembly work of the coil main body 10 into the case becomes very complicated. Therefore, as shown in FIGS. 3A and 3B in this embodiment mode, a pin burying portion 23 burying a connecting pin 26 thereinto in the axial direction is projected and formed on the outer circumferential face of the coil case 20. The lead portion 11 of the coil main body 10 is constructed so as to be connected to the upper end of the connecting pin 26 projected onto the top face of this pin burying portion 23. Thus, the assembly work becomes greatly easy. The terminal pad 21 is arranged on the bottom face of the pin burying portion 23, and a lower end portion of the connecting pin 26 is conducted to the terminal pad 21.

The coil axis of the antenna coil 1 is conformed to the normal direction of the substrate face so that directivity with respect to transmission and reception of a radio wave in this direction is raised. Separate coils 7, 8 having axes conformed to two independent directions within the substrate face may be also mounted to the substrate 17 (these coils 7, 8 are drawn by omitting connection wiring in FIG. 4, but each of these coils 7, 8 is connected to the antenna coil 1 in parallel).

As shown in FIG. 5, the above communication substrate module 3M is stored to a box body 18 of a card shape in a shape for conforming the thickness direction to the substrate 17 so that a card type wireless device 3 is constructed. This card type wireless device 3 is used as a wireless key for an automobile, and is advantageously stored into a purse, etc. since this card type wireless device 3 is thin. As shown in FIG. 4, a dry battery 16 as a driving power source of the signal transmitting-receiving circuit 14 is also stored to the box body 18. Further, a mechanical type key 137 for emergency is also stored to the box body 18, and can be detached from a slot 138 formed on the side face of the box body 18 as shown in FIG. 5.

As shown in FIG. 4, a body system ECU 107 of the automobile 105 periodically sends out a request radio wave for detecting approaching of a user carrying the card type wireless device 3 from an antenna 116 through a signal transmitting-receiving circuit 115 connected to this body system ECU 107. When the user approaches the automobile 105 within a constant distance, the LF antenna 13 built in the card type wireless device 3 receives this request radio wave. The signal transmitting-receiving circuit 14 receives this request radio wave and sends out an ID code for authentication by a radio wave of a prescribed frequency band. The automobile side body system ECU 107 receiving this ID code radio wave through the antenna 116 and the signal transmitting-receiving circuit 115 authenticates whether the sent ID is a correct ID. When the authentication is received, the body system ECU 107 outputs an unlock allowance signal for releasing the door lock and a starting allowance signal of an engine. Here, reference numeral 119 represents a transponder circuit.

On the other hand, when the dry battery 16 of the card type wireless device 3 is consumed and no signal transmitting-receiving circuit 14 is operated, the request radio wave received by the LF antenna 13 is sent to the transponder circuit 15. In the transponder circuit 15, electromotive force excited in the antenna coil 10 by the request radio wave is set to electric power, and the transponder circuit 15 sends out an ID code radio wave from the LF antenna 13. In the automobile 105, this ID code radio wave is received by antennas 113 and 116, and processings after the authentication can be similarly performed. Namely, the transponder circuit of the card type wireless device 3 functions as a backup circuit at a battery running-out time.

When the above card type wireless device 3 is carried together with a purse, etc., there is a fear that a conductor of a comparatively large area such as a coin, etc. covers the antenna coil 1, and the sensitivity of the antenna and Q (frequency selecting degree) are reduced. However, even when a situation for overlapping the coin with the main surface of the card type wireless device 3 is supposed, it is possible to reduce the probability that the antenna coil 1 is perfectly covered with the coin, etc. as mentioned above if the antenna coil 1 is mounted to the substrate as a flat air-core type coil of a constant area or more as shown in FIG. 4. In its turn, the card type wireless device 3 of high sensitivity can be realized.

The planar outer shape of the card type wireless device 3 can be set to have short sides of 40 mm or more and 60 mm or less (e.g., 50 mm), and 75 mm or more and 95 mm or less (e.g., 85 mm), and a thickness of 2 mm or more and 5 mm or less (e.g., 4 mm) (e.g., this planar outer shape has about the same size as the size of a credit card). In the assembled antenna coil, the area of a planar outer shape area can be set to 8 $cm^2$ or more and 15 $cm^2$ or less (e.g., 12 $cm^2$). The width of the coil main body 10 at a projecting time to a projecting face perpendicular to the axis can be set to 1 mm or more and 4 mm or less (e.g., 3 mm). Further, the thickness of the coil case 20 in its axial direction can be set to 1 mm or more and 3 mm or less (e.g., 1.6 mm). As described later, in this embodiment mode, the antenna coil 1 is constructed so as to have a planar mode of a rectangular shape, and have a short side of 25 mm or more and 35 mm or less (e.g., 30 mm), and a long side of 35 mm or more and 45 mm or less (e.g., 40 mm).

Further, the diameter of a winding wire of the coil is set to 50 μm or more and 70 μm or less (a resin (e.g., polyurethane) coating wire having a coating thickness of 2 μm or more and 5 μm or less (e.g., 3 μm)). The number of turns is set to 200 or more and 300 or less (the intrinsic inductance of the coil main body 10 is set to 4 mH or more and 6 mH or less). The electrostatic capacity of the capacitor 12 is set to 300 pF or more and 400 pF or less (e.g., 350 pF). Thus, a resonance frequency of the LF antenna 13 can be adjusted to 100 kHz or more and 150 kHz or less (e.g., 134 kHz). The Q-value of the antenna can be realized as 18 to 21.

Further, the radio wave magnetic field relating to the antenna signal transmission and reception can be concentrated onto the coil case 20, in its turn, the coil main body 10 by constructing the coil case (coil support body) 20 by the above resin ferrite. Accordingly, it is possible to contribute to the improvements of sensitivity and gain of the antenna.

Figure 13:
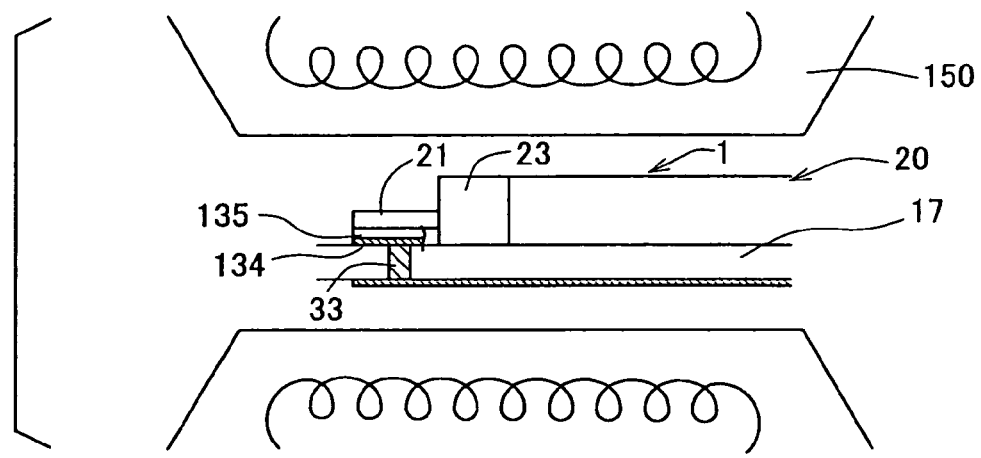
FIG. 13 is a schematic view explaining a method for manufacturing a communication module according to the embodiment of the present invention.
Figure 14A:
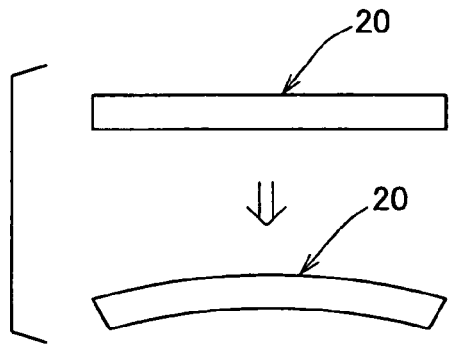
FIG. 14A is a schematic view explaining a warpage of a coil case in a reflow process.
Figure 14B:
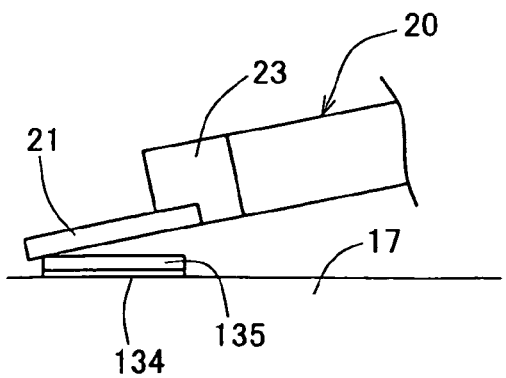
FIG. 14B is a schematic view showing soldering failure of the coil case.

As shown in FIG. 13, in the communication substrate module 3M used in the above card type wireless device 3, a coil side terminal portion 21 of the antenna coil 1 is positioned in a substrate side terminal portion (substrate side pad) 134 together with a soldering material 135 for connection. In its state, the substrate 17 is inserted into a reflow furnace 150 together with the antenna coil 1 positioned and placed on this substrate 17, and is heated. Thus, the soldering material 135 is melted and the coil side terminal portion 21 is soldered and connected to the substrate side terminal portion 134 so that the communication substrate module 3M is manufactured. At this time, as shown in FIGS. 14A and 14B, in an antenna case, i.e., the pin burying portion 23 on the substrate 17, heat transfer onto the substrate 17 side is easily advanced on the lower face side. On the other hand, a large amount of radiant heat from a furnace heat source is easily received on the upper face side. Accordingly, a rise in temperature of the upper face side is easily advanced so that a temperature gradient of the thickness direction is easily caused between the upper face side and the lower face side facing the substrate 17. Thus, expansion displacement of the in-plane direction on the upper face side becomes greater than that on the lower face side. When the coil case 20 is constructed by a resin simplex of low synthesis, a warp is easily caused in an upwardly convex mode. As its result, the coil side terminal portion 21 is floated from the substrate side pad (substrate side terminal portion) 134 by this warp so that a soldering defect is easily caused. However, since the coil case 20 is constructed by the resin ferrite formed by compounding the soft ferrite powder higher in Young's modulus than resin, its rigidity is raised and a warp of the coil case 20 can be restrained even when thermal stress is applied at the above solder reflow time.

Figure 6A:
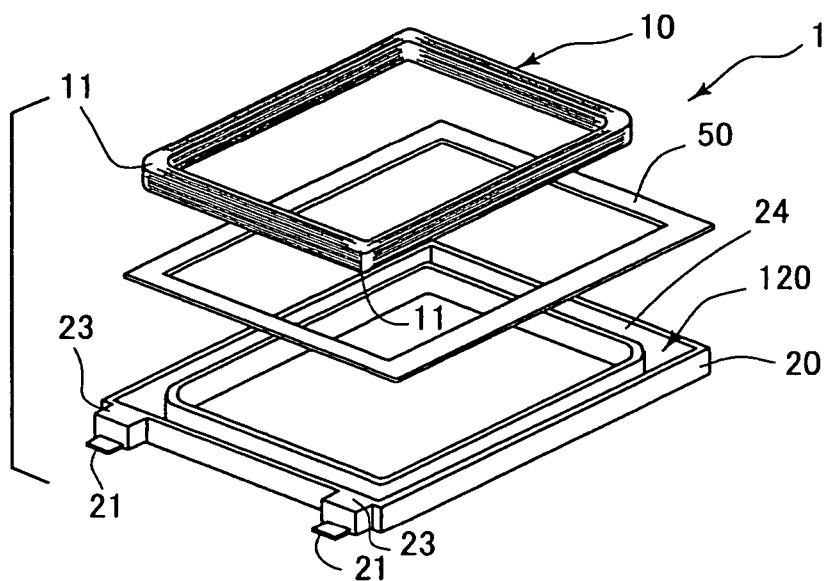
FIG. 6A is an exploded perspective view showing an antenna coil according to a first modification of the present invention.
Figure 6B:
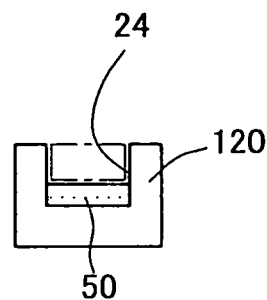
FIG. 6B is a cross sectional view showing the antenna coil in FIG. 6A.

A modified example of the antenna coil 1 of the invention will next be explained (portions common to FIGS. 1 and 2 are designated by the same reference numerals, and their explanations are omitted). In the antenna coil 1 of FIGS. 6A and 6B, a coil case 120 of a mode similar to that of FIGS. 2A to 2D is arranged but is constructed as an injection molding product of a PPS resin simplex. A coil support body 50 is arranged between the coil case 120 and the coil main body 10 on the bottom face of the coil storing portion 24 of the coil case 120. The coil support body 50 is constructed as a resin ferrite molding product of a ring shape and a plate shape in which soft ferrite powder is coupled by PPS resin. The resin ferrite molding product constituting this coil support body 50 can be manufactured as an injection molding product or a die press molding product separated from the coil case 120.

Figure 7:
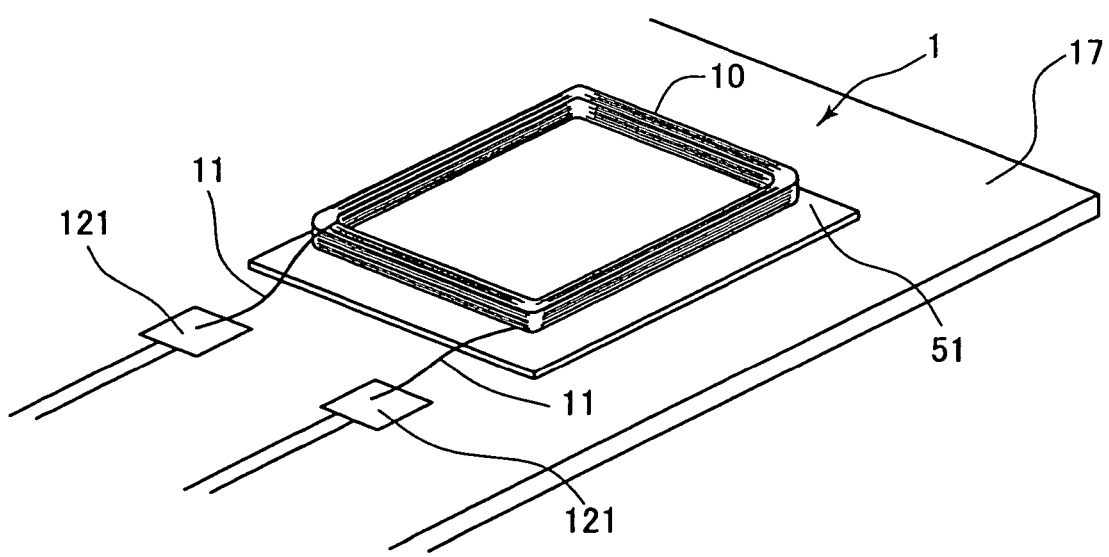
FIG. 7 is a perspective view showing an antenna coil according to a second modification of the present invention.

In the antenna coil 1 of FIG. 7, no coil case is arranged and a coil support body 51 is constructed by a molding body of a sheet shape of a resin coupling soft magnetic material including an area surrounded by a coil outer shape line when the coil main body 10 is projected to a plane perpendicular to its axis. A lead portion 11 from the coil main body 10 is directly soldered to a pad 121 on the substrate 17. An outer circumferential edge of the coil support body 51 of a sheet shape is formed in a rectangular shape extended out of the above outer shape line of the coil main body 10.

Figure 8:
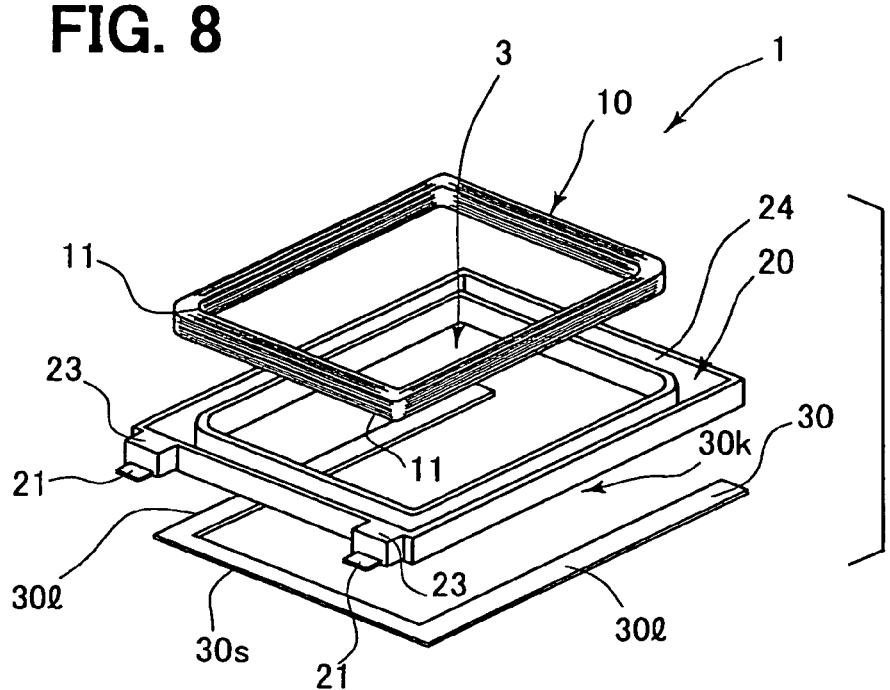
FIG. 8 is an exploded perspective view showing an antenna coil according to a third modification of the present invention.

In the construction of FIG. 8, a reinforcing frame 30 constructed by a material higher in Young's modulus than the resin ferrite is integrated along the circumferential direction of the coil case 20 constructed by the resin ferrite. Thus, the warp preventing effect of the coil case 20 at the reflow time is further raised. The reinforcing frame 30 is buried in the bottom portion 20b of the coil case 20 for forming the coil storing portion 24 of this groove shape. Concretely, the reinforcing frame 30 is buried to the bottom portion 20b of the coil case 20 by insert molding in a mode in which the outer face of the reinforcing frame 30 and the outer face of the bottom portion 20b become the same face.

The reinforcing frame 30 is set to a metallic frame (hereinafter also called the metallic frame 30). The metallic material is high in Young's modulus and is excellent in processing property, and it is easy to cope with a frame shape corresponding to the coil case 20 of an air-core type by punching processing, etc. Further, the frame sectional shapes of an L-shape and a C-shape can be also easily obtained by press working. The metallic frame is a conductor. As shown by quoting FIG. 15, when the metallic frame is formed in a continuous ring shape mode (reference numeral 37) along the coil case 20, an electric current path turned around the axis of the coil main body 10 is formed. Accordingly, the problem that the metallic frame is inductively coupled to the coil main body 10 and the apparent inductance of the entire antenna coil is reduced, is caused. Namely, when a radio wave magnetic field H extending through the coil main body 10 is changed, an induced electric current is flowed to the metallic frame 30. The radio wave magnetic field relating to the antenna signal transmission and reception is canceled by its reverse magnetic field H' so that the apparent inductance is reduced. In particular, in the case of the LF antenna 13 shown in FIG. 4, the capacitor 12 adjusted in capacity so as to cause a resonance point at a desirable frequency with respect to the inductance of its coil main body 10 is connected to the antenna coil 1 in parallel. The Q-value of the antenna is determined by the characteristics of its LC parallel resonating circuit. However, when the metallic frame is formed in a mode as shown by reference numeral 37 of FIG. 15, the apparent inductance of the antenna coil is reduced by its induction coupling. The resonance point of the above LC parallel resonating circuit is shifted from the desirable frequency so that the Q-value and the antenna gain are greatly reduced. In this case, when an insulating portion 30k for partially dividing the electric current path turned around the axis of the coil main body 10 is arranged in an intermediate position in the circumferential direction of the metallic frame 30, the above disadvantages can be very effectively dissolved.

In the constructional material of the metallic frame 30, aluminum or an aluminum alloy is comparatively excellent in strength and corrosive property and is preferable in processing property and can be therefore preferably adopted. On the other hand, the constructional material of the metallic frame 30 can be also set to an iron system material. In this case, a non-magnetic material such as austenite system stainless steel can be also used (aluminum or the aluminum alloy is also non-magnetic), but an iron system soft magnetic material can be also adopted. The soft magnetic material is a ferromagnetic material and is high in magnetic permeability and a radio wave magnetic field relating to the antenna signal transmission and reception can be concentrated onto the metallic frame 30. Accordingly, it is possible to contribute to the improvements of sensitivity and gain of the antenna. As the iron system soft magnetic material, it is possible to adopt a silicon steel plate, general carbon steel, an Fe—Ni alloy (e.g., permalloy, etc.) or ferrite system stainless steel, etc. in addition to electromagnetic soft iron (it can be also said that the electromagnetic soft iron and the ferrite system stainless steel are advantageous from the viewpoint of processing property).

In FIG. 8, in the above metallic frame 30 arranged in a shape along the ring shape path set in the circumferential direction of the coil case 20, the above insulating portion 30k is set to a notch portion (hereinafter also called a notch portion 30k) in which the metallic frame 30 is notched at a partial interval of the arranging path. The insulating portion 30k for partially dividing an electric current conducting path of the circumferential direction can be simply formed by setting the metallic frame 30 to an ended shape instead of the continuous ring shape and spacing its end portions by a constant length and setting a notch mode.

The outer shape lines of the coil main body 10 and the coil case 20 are rectangular shapes, and the metallic frame 30 is arranged in a C-shape including one short side portion 30s corresponding to the outer shape line of the rectangular shape, and two long side portions 301 connected to both ends of this short side portion 30s. The above notch portion 30k is formed by using the entire interval on the remaining short side of the outer shape line of the rectangular shape. If the C-shaped portion provided by integrating the two long side portions 301 and the one short side portion 30s is formed in the metallic frame 30, rigidity with respect to twisting deformation of a frame face is raised in comparison with a case partially divided and formed on each side of the rectangular shape, and a warp causing the twisting deformation can be effectively restrained.

In FIGS. 9 and 10, metallic frames 32, 31 have main body portions 32a, 31a arranged in a C-shape on the bottom face of the coil case 20. In at least two long side portions 321, 311, reinforcing rib portions 32b, 31c exposed to the outer circumferential face or the inner circumferential face of the coil case 20 are integrated in the main body portions 32a, 31a in a shape forming an L-shaped section together with these main body portions 32a, 31a. Since the sectional shape of the metallic frame 30 is set to the L-shape correspondingly to the long side portion 301 of the coil case 20 easily amplified in warp displacement, its bending rigidity is raised and the warp deformation of the long side direction can be effectively restrained.

Figure 9A:
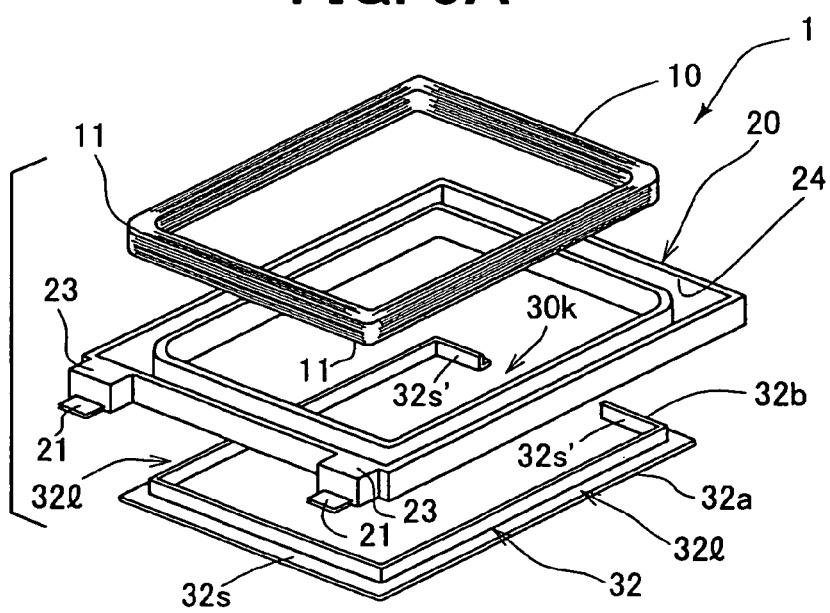
FIG. 9A is an exploded perspective view showing an antenna coil according to a fourth modification of the present invention.
Figure 9B:
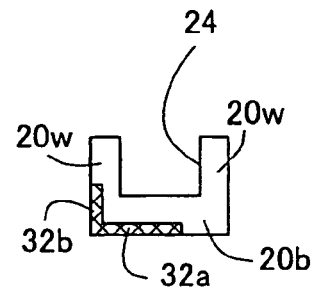
FIG. 9B is a cross sectional view showing the antenna coil in FIG. 9A.

In FIGS. 9A and 9B, the reinforcing rib portion 32b is formed in a continuous C-shape laid across one short side portion 32s and two long side portions 321 connected to both ends of this short side portion 32s'. When the reinforcing rib portion 32b is formed in this way, it is possible to further raise rigidity with respect to twisting deformation of the frame face made by the C-shaped portion. Each of the main body portion 32a and the reinforcing rib portion 32b is formed in a shape laid across a partial interval, i.e., the short side portion 32s' constituting both end portions of the remaining short side portions from two long side portions 321 so that a reinforcing effect is further raised. The metallic frame 32 is integrated with the coil case 20 by insert molding such that the main body portion 32a has the same face as the outer face of the bottom portion 20b of the coil case 20 and the reinforcing rib portion 32b has the same face as the outer face of a side wall portion 20w. Here, the reinforcing rib portion 32b is arranged on the inner circumferential face side of the coil case 20b, but may be also arranged on the outer circumferential face side.

Figure 10A:
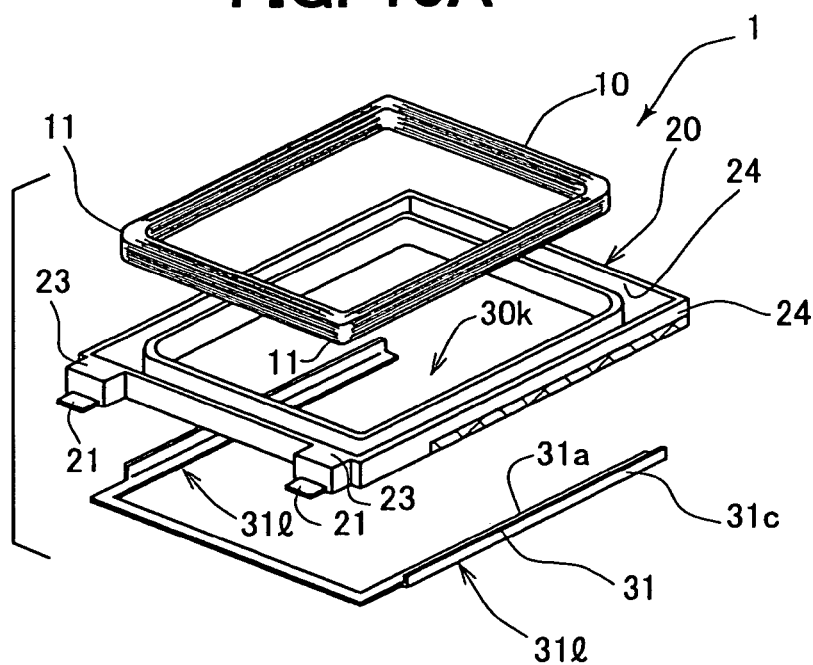
FIG. 10A is an exploded perspective view showing an antenna coil according to a fifth modification of the present invention.
Figure 10B:
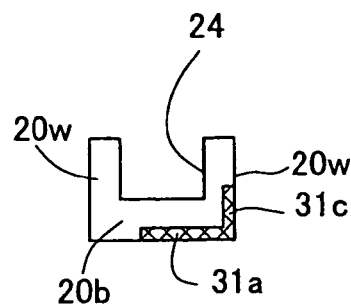
FIG. 10B is a cross sectional view showing the antenna coil in FIG. 10A.

On the other hand, in the construction of FIGS. 10A and 10B, the reinforcing rib portion 31c is arranged in only two long side portions 311 of the main body portion 31a. This mode has an advantage in that manufacture using press working, etc. is easy. Here, the reinforcing rib portion 31c is arranged on the outer circumferential face side of the coil case 20b (may be also reversely arranged).

Figure 11:
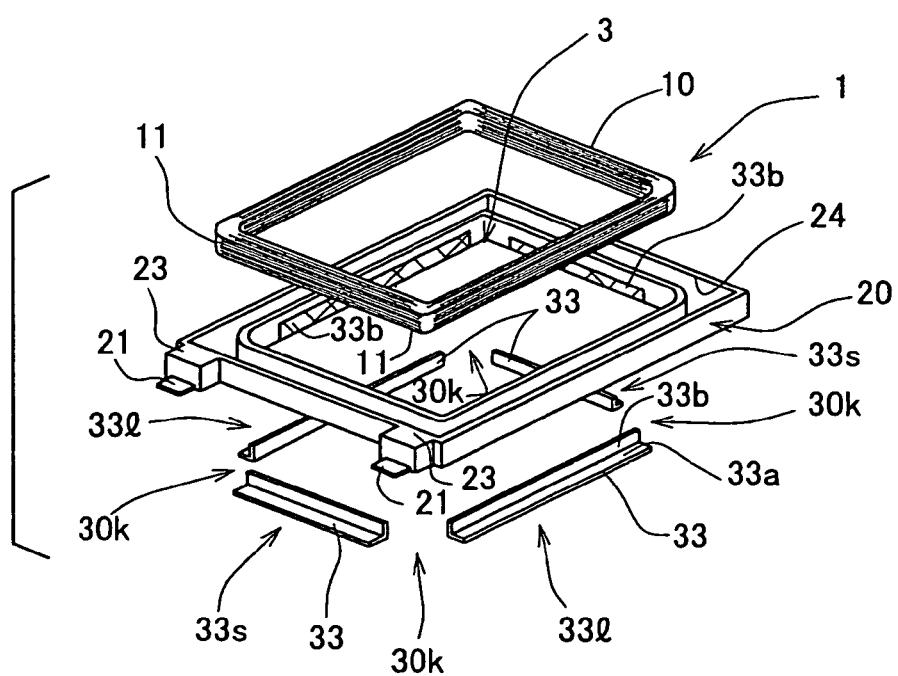
FIG. 11 is an exploded perspective view showing an antenna coil according to a sixth modification of the present invention.

In the construction of FIG. 11, a metallic frame 33 is constructed by forming notch portions 30k in four corner portions of the outer shape line of a rectangular shape, and dividing the metallic frame 33 into four portions constructed by two long side portions 331 and two short side portions 33s by this notch portion 30k. In accordance with this construction, there is an advantage able to reinforce all the four sides of the coil case 20 of the rectangular shape. In this case, the warp preventing effect can be further notably achieved by constructing each portion so as to have an L-shaped section which has a main body portion 33a arranged on the bottom face of the coil case 20, and also has a reinforcing rib portion 33b integrated with this main body portion 33a in a shape exposed to the inner circumferential face (or the outer circumferential face) of the coil case 20.

Figure 12:
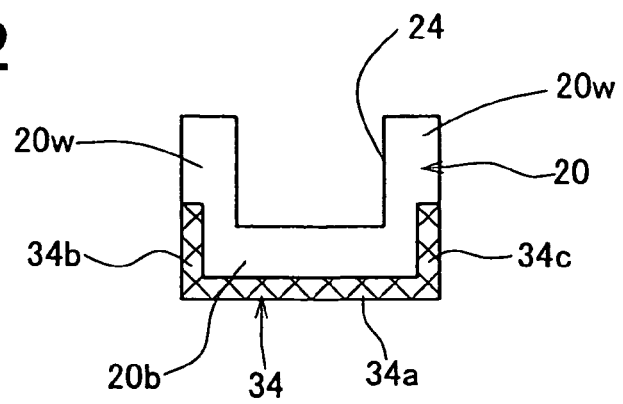
FIG. 12 is a cross sectional view showing an antenna coil according to a seventh modification of the present invention.

In the construction of each of FIGS. 9, 10 and 11, the metallic frame 34 can be constructed so as to have the sectional shape of a C-shaped mode formed by integrating the main body portion 34a arranged in the bottom portion 20b of the coil case 20, and a pair of reinforcing rib portions 34b, 34c respectively arranged in two side wall portions 20w as shown in FIG. 12.

Figure 15:
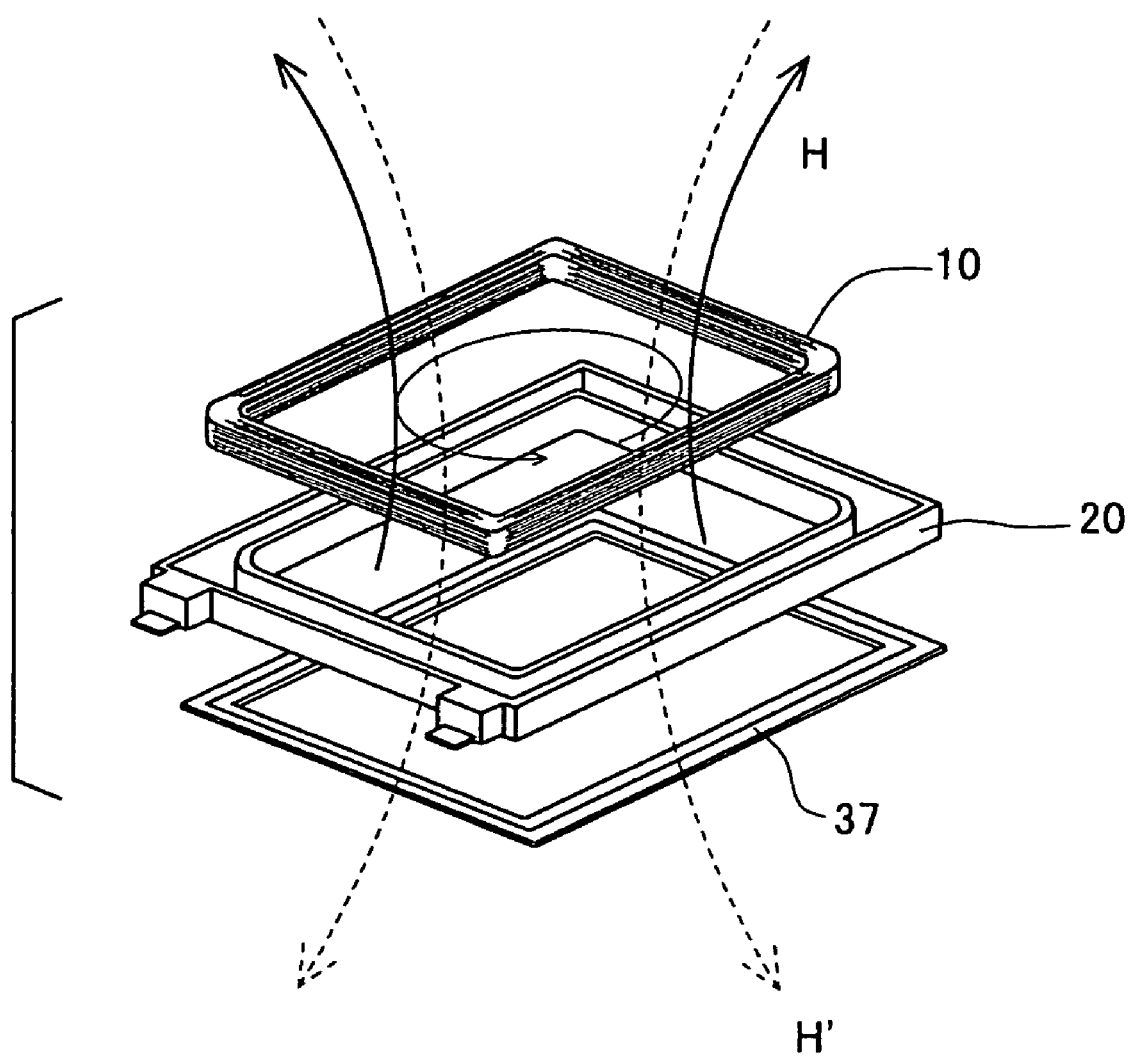
FIG. 15 is an exploded perspective view showing an antenna coil according to an eighth modification of the present invention.

The material of the reinforcing frame is not particularly limited if the Young's modulus of this material is higher than that of the resin ferrite constituting the coil case 20. For example, it is also possible to adopt an insulating inorganic material such as glass, ceramic of alumina, etc., sintering soft ferrite, etc. Further, the material of the reinforcing frame can be also constructed by a resin composite material strengthened by a filler of glass, ceramic, etc. In this case, since the reinforcing frame 37 becomes an insulator, there is no fear of a reduction in apparent inductance by inductive coupling to the coil main body 10 even when the reinforcing frame 37 is constructed in the mode of a continuous ring shape in the circumferential direction in the coil case 20 as shown in FIG. 15. Accordingly, it is excellent in the reinforcing effect of the coil case 20. In this case, when the reinforcing frame 37 is constructed by sintering soft ferrite and resin ferrite formed by resin-coupling soft ferrite powder, the radio wave magnetic field relating to the antenna signal transmission and reception can be concentrated onto the metallic frame 37. Accordingly, it is possible to contribute to the improvements of sensitivity and gain of the antenna.

The present inventions have the following aspects.

An antenna coil includes: an air-core type flat coil body having a thickness in an axial direction of the coil body; and a coil support member disposed between the coil body and a substrate as a mounting object of the antenna coil so that the coil body is supported on a surface of the substrate. The thickness of the coil body is smaller than a radius of a circle, an area of which is equal to an area of a region surrounded with an outline of a projected coil body, the projected coil body provided by projecting the coil body on a projection plane perpendicular to the axial direction of the coil body. The coil support member is made of resin hardened soft magnetic material.

In the above coil, since the coil support member is made of resin hardened soft magnetic material, the sensitivity and the gain of the antenna coil are improved. This is because the resin hardened soft magnetic material is a ferromagnetic material, and has high magnetic permeability so that magnetic field of an electric wave for participating in transmission/reception of the antenna coil is concentrated. Thus, the antenna coil has high sensitivity and high antenna gain.

Alternatively, the resin hardened soft magnetic material may be made of soft ferrite powder. The soft ferrite is an oxide soft magnetic material having a spinel structure. The soft ferrite has high magnetic permeability and low eddy-current loss. Therefore, the concentration of the magnetic field of the electric wave is much improved. Further, corrosion resistance of the antenna coil is improved.

In general, the soft ferrite is a kind of ceramics. Therefore, the soft ferrite has low machining performance, so that it is difficult to form a thin plate support member and to form a support member having a complicated shape. Furthermore, a manufacturing cost of a flat coil for mounting on a substrate become higher. Further, the soft ferrite is brittle. Accordingly, when a product of the soft ferrite is handled, and a shock is applied to the product, the product may be cracked or broken. However, in the above coil, since the coil support member is made of the resin hardened soft magnetic material, the support member can be easily formed to have a thin plate shape or a complicated shape. Further, production yielding ratio of the coil increases. Here, the resin hardened soft magnetic material is such that a soft ferrite powder is molded with resin so that a resin ferrite is formed. In this case, by utilizing fluidity of the resin when the resin is melted or in an uncured state, the resin hardened soft magnetic material is easily synthesized by using an injection molding method or a press molding method. Further, because of flexibility of the resin, the shock resistance of the support member made of the resin hardened soft magnetic material is improved. Thus, the support member is prevented from cracking and breaking when the support member is used.

The soft ferrite powder is, for example, well known spinel ferrite such as Mn—Zn ferrite and Ni—Zn ferrite. Alternatively, the resin hardened soft magnetic material may be made of iron soft magnetic material powder such as soft iron, permalloy, and permendule.

It is preferred that a content of the soft magnetic material powder in the resin hardened soft magnetic material is in a range between 5 vol. % and 85 vol. %. When the content of the soft magnetic material powder is smaller than 5 vol. %, the concentration of the magnetic field of the electric wave is not sufficient. When the content of the soft magnetic material powder is larger than 85 vol. %, the flexibility of the resin hardened soft magnetic material becomes small, so that the coil support member may be cracked. Specifically, when the resin and the soft magnetic material powder are mixed, and mixture of them as a compound is injected in order to form the support member, it is preferred that the content of the soft magnetic material powder is in a range between 5 vol. % and 65 vol. %. More preferably, the content of the soft magnetic material powder is in a range between 10 vol. % and 40 vol. %. On the other hand, when the support member is formed by a die molding method, the content of the soft magnetic material powder may be in a range between 50 vol. % and 85 vol. %. Thus, the concentration of the magnetic field of the electric wave is much improved. Here, preferably, the shape of the support member is a block or a sheet.

Preferably, the resin for molding the soft magnetic material is capable of being injected in a case where the resin hardened soft magnetic material is formed by the injection molding method, and has resistance of softening and deforming in a case where thermal hysteresis is applied to the resin when the antenna coil is mounted on the substrate in a solder reflow process. Specifically, the resin is, for example, poly phenylene sulfide (i.e., PPS) having a melting point of 282° C., an upper temperature limit of about 240° C. and a thermal deformation temperature equal to or higher than 260° C. Here, the upper temperature limit is defined as a temperature, at which the resin is capable of continuously using. Alternatively, the resin may be thermoplastic poly-imide having a melting point of 388° C. When the support member is formed by the die press molding method, the resin may be cross-linkage type resin such as epoxy resin. For example, the resin in an uncured state or in a half-cured state is mixed into the soft magnetic material, and then, they are pressed by using a die. The pressed resin with the soft magnetic material is hardened so that the resin hardened soft magnetic material is formed.

Alternatively, the coil support member may include a ring portion disposed along with a circumferential direction of the coil body, and the ring portion is made of the resin hardened soft magnetic material. Thus, the magnetic field of the electric wave is effectively concentrated near the coil body, so that the sensitivity and the gain of the antenna coil are improved.

Alternatively, the coil support member may be a coil case having a coil accommodation space for accommodating the coil body therein. The coil case may include a ring shape body corresponding to the coil body, and the coil case has a part, which is made of the resin hardened soft magnetic material. In this case wherein the coil body is accommodated in the coil case, the antenna coil can be treated as a discrete part. Therefore, when the antenna coil is mounted on the substrate, assembling efficiency of the antenna coil is improved. Further, since the part of the coil case is made of the resin hardened soft magnetic material, the magnetic field of the electric wave is effectively concentrated at the antenna coil. Thus, the sensitivity and the gain of the antenna are improved.

Alternatively, the coil accommodation space may be a groove with an opening, which is disposed on one side of the coil case in the axial direction. The ring shape body of the coil case may include a bottom. The bottom of the coil case may be made of the resin hardened soft magnetic material, and the bottom of the coil case corresponds to a circumference of the coil body having a ring shape. In this case, the coil body, which is formed in another process for winding, is easily accommodated and mounted in the coil accommodation space from the opening of the groove. Further, in this case, after the antenna coil is mounted on the substrate, the ring shape body made of the resin hardened soft magnetic material corresponding to the coil body is disposed under the coil body. Therefore, the magnetic field of the electric wave is much concentrated at the antenna coil.

Alternatively, the ring shape body of the coil case may further include a pair of sidewalls, and each sidewall may be disposed on one edge of the bottom of the coil case so that the sidewalls and the bottom are integrally made of the resin hardened soft magnetic material. The resin hardened soft magnetic material is easily synthesized. Therefore, the coil case having the complicated shape with the groove for the accommodation space is easily formed. Further, not only the bottom but also the sidewalls of the coil case can be made of the resin hardened soft magnetic material, so that the magnetic field of the electric wave is much concentrated at the antenna coil. Preferably, the coil case is formed by the injection molding method.

Alternatively, the coil support member may be a coil case having a coil accommodation space for accommodating the coil body therein. The coil case may include a ring shape body corresponding to the coil body. The coil accommodation space may be a groove with an opening, which is disposed on one side of the coil case in the axial direction. The ring shape body of the coil case may include a bottom. The bottom of the coil case may correspond to a circumference of the coil body having a ring shape. The coil support member may further include a coil support ring, which is separated from the coil case. The coil support ring may be disposed on the bottom of the coil case so that the coil support ring is disposed between the coil case and the coil body. The coil support ring may be made of the resin hardened soft magnetic material. In this case, the coil support ring is separated from the coil case, and the coil support ring is disposed on the bottom of the coil case. Therefore, the magnetic field of the electric wave is effectively concentrated. Further, alternatively, the coil case may be made of other material other than the resin hardened soft magnetic material. For example, the coil case may be made of thermoplastic resin such as PPS and thermoplastic polyimide. In this case, the coil case is formed by, for example, the injection molding method. The coil support ring may be formed by, for example, the injection molding method or a press molding method. When the coil support ring is formed by the press molding method, the content of the soft magnetic material powder can be much higher so that the magnetic field of the electric wave is much concentrated at the antenna coil.

When a part of the coil case is made of the resin hardened soft magnetic material, the following points may be obtained, compared with a case where the coil support ring is separated from the coil case. A coil side terminal of the antenna coil can be positioned, i.e., aligned at a substrate side terminal of the substrate together with a solder member. Then, the substrate with the antenna coil is heated in a solder reflow furnace so that the solder member is melted and the coil side terminal is soldered to the substrate side terminal. Thus, the communication module is formed. During this process for forming the module, the antenna coil mounted on the substrate may have warpage since the reflow furnace has temperature distribution so that the temperature in the reflow furnace is not homogeneous. However, when the a part of the coil case is made of the resin hardened soft magnetic material, the soft magnetic material as a filler is mixed into the resin, so that rigidity of the coil case is improved. Thus, the coil case is prevented from warpage even if the thermal stress is applied to the coil case when the substrate together with the antenna coil is heated in the solder reflow furnace in order to form the communication module. Thus, failure ratio of the communication module is much reduced.

Alternatively, the antenna coil may further include: a reinforcing frame made of material having a Young's modulus larger than that of the resin hardened soft magnetic material of the coil case. The reinforcing frame is disposed on the bottom of the coil case. In this case, the warpage of the coil case is much prevented.

Alternatively, the antenna coil may further include: a reinforcing frame made of material having a Young's modulus larger than that of the resin hardened soft magnetic material of the coil case. The reinforcing frame is disposed on the bottom and at least one of the sidewalls of the coil case.

Alternatively, the coil support member may cover the region surrounded with the outline of the projected coil body, and the coil support member may be made of a sheet of the resin hardened soft magnetic material. In this case, since the sheet of the resin hardened soft magnetic material has a simple shape, the coil support member can be formed by a calendar molding method, a doctor blade method, an injection molding method or a die press method, so that the coil support member can be easily formed.

Further, a method for manufacturing a communication module having an antenna coil and a transmitting/receiving circuit, which are mounted on a substrate, is provided. The antenna coil is connected to the transmitting/receiving circuit. The method includes the steps of: positioning a coil side terminal of the antenna coil together with a solder member for connecting between a substrate side terminal of the substrate and the coil side terminal of the antenna coil; and heating the substrate together with the antenna coil in a solder reflow furnace so that the solder member is melted and soldered between the coil side terminal and the substrate side terminal. The antenna coil further includes: an air-core type flat coil body having a thickness in an axial direction of the coil body; and a coil support member disposed between the coil body and a substrate as a mounting object of the antenna coil so that the coil body is supported on a surface of the substrate. The thickness of the coil body is smaller than a radius of a circle, an area of which is equal to an area of a region surrounded with an outline of a projected coil body, the projected coil body provided by projecting the coil body on a projection plane perpendicular to the axial direction of the coil body. The coil support member is a coil case having a coil accommodation space for accommodating the coil body therein. The coil case includes a ring shape body corresponding to the coil body, and the coil case includes a part, which is made of the resin hardened soft magnetic material.

In the above communication module, since the coil support member is made of resin hardened soft magnetic material, the sensitivity and the gain of the antenna coil are improved. This is because the resin hardened soft magnetic material is a ferromagnetic material, and has high magnetic permeability so that magnetic field of an electric wave for participating in transmission/reception of the antenna coil is concentrated. Thus, the antenna coil has high sensitivity and high antenna gain.

Further, a card type wireless device includes: a communication module having an antenna coil, a transmitting/receiving circuit connecting to the antenna coil, and a substrate; and a card type casing. The antenna coil includes: an air-core type flat coil body having a thickness in an axial direction of the coil body; and a coil support member disposed between the coil body and a substrate as a mounting object of the antenna coil so that the coil body is supported on a surface of the substrate. The thickness of the coil body is smaller than a radius of a circle, an area of which is equal to an area of a region surrounded with an outline of a projected coil body, the projected coil body provided by projecting the coil body on a projection plane perpendicular the an axial direction of the coil body. The coil support member is made of resin hardened soft magnetic material. The coil body includes an axis, which coincides with a normal line of the substrate. The card type casing accommodates the communication module in such a manner that a thickness direction of the substrate coincides with a thickness direction of the card type casing.

In the above wireless device, since the coil support member is made of resin hardened soft magnetic material, the sensitivity and the gain of the antenna coil are improved. This is because the resin hardened soft magnetic material is a ferromagnetic material, and has high magnetic permeability so that magnetic field of an electric wave for participating in transmission/reception of the antenna coil is concentrated. Thus, the antenna coil has high sensitivity and high antenna gain. Further, the card type wireless device is suitably used for a wireless entry key of an automotive vehicle. Further, the card type wireless device is thin. Therefore, it is preferable to put the card type wireless device into a wallet or the like.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. An antenna coil comprising:

an air-core type flat coil body having a thickness in an axial direction of the coil body; and a coil support member disposed between the coil body and a substrate as a mounting object of the antenna coil so that the coil body is supported on a surface of the substrate, wherein the thickness of the coil body is smaller than a radius of a circle, an area of which is equal to an area of a region surrounded with an outline of a projected coil body, the projected coil body provided by projecting the coil body on a projection plane perpendicular to the axial direction of the coil body, and the coil support member is made of resin hardened soft magnetic material; and wherein the coil support member is a coil case having a coil accommodation space for accommodating the coil body therein, the coil case includes a ring shaped body corresponding to the coil body, and the coil case has a part, which is made of the resin hardened soft magnetic material.

2. The antenna coil according to claim 1, wherein the resin hardened soft magnetic material is made of soft ferrite powder.

3. The antenna coil according to claim 1, wherein the coil support member includes a ring portion disposed along with a circumferential direction of the coil body, and the ring portion is made of the resin hardened soft magnetic material.

4. The antenna coil according to claim 1, wherein the coil accommodation space is a groove with an opening, which is disposed on one side of the coil case in the axial direction, the ring shaped body of the coil case includes a bottom, the bottom of the coil case is made of the resin hardened soft magnetic material, and the bottom of the coil case corresponds to a circumference of the coil body having a ring shape.

5. The antenna coil according to claim 4, wherein the ring shaped body of the coil case further includes a pair of sidewalls, and each sidewall is disposed on one edge of the bottom of the coil case so that the sidewalls and the bottom are integrally made of the resin hardened soft magnetic material.

6. The antenna coil according to claim 3, wherein the coil support member is a coil case having a coil accommodation space for accommodating the coil body therein, the coil case includes a ring shaped body corresponding to the coil body, the coil accommodation space is a groove with an opening, which is disposed on one side of the coil case in the axial direction, the ring shaped body of the coil case includes a bottom, the bottom of the coil case corresponds to a circumference of the coil body having a ring shape, the coil support member further includes a coil support ring, which is separated from the coil case, the coil support ring is disposed on the bottom of the coil case so that the coil support ring is disposed between the coil case and the coil body, and the coil support ring is made of the resin hardened soft magnetic material.

7. The antenna coil according to claim 4, further comprising:

a reinforcing frame made of material having a Young's modulus larger than that of the resin hardened soft magnetic material of the coil case, wherein the reinforcing frame is disposed on the bottom of the coil case.

8. The antenna coil according to claim 5, further comprising:

a reinforcing frame made of material having a Young's modulus larger than that of the resin hardened soft magnetic material of the coil case, wherein the reinforcing frame is disposed on the bottom and at least one of the sidewalls of the coil case.

9. The antenna coil according to claim 3, wherein the coil support member covers the region surrounded with the outline of the projected coil body, and the coil support member is made of a sheet of the resin hardened soft magnetic material.

10. A method for manufacturing a communication module having an antenna coil and a transmitting/receiving circuit, which are mounted on a substrate, wherein the antenna coil is connected to the transmitting/receiving circuit, the method comprising the steps of:

positioning a coil side terminal of the antenna coil together with a solder member for connecting between a substrate side terminal of the substrate and the coil side terminal of the antenna coil; and heating the substrate together with the antenna coil in a solder reflow furnace so that the solder member is melted and soldered between the coil side terminal and the substrate side terminal, wherein the antenna coil further includes:

an air-core type flat coil body having a thickness in an axial direction of the coil body; and a coil support member disposed between the coil body and a substrate as a mounting object of the antenna coil so that the coil body is supported on a surface of the substrate, the thickness of the coil body is smaller than a radius of a circle, an area of which is equal to an area of a region surrounded with an outline of a projected coil body, the projected coil body provided by projecting the coil body on a projection plane perpendicular to the axial direction of the coil body, the coil support member is a coil case having a coil accommodation space for accommodating the coil body therein, the coil case includes a ring shaped body corresponding to the coil body, and the coil case includes a part, which is made of the resin hardened soft magnetic material.

11. The method according to claim 10, wherein the coil accommodation space is a groove with an opening, which is disposed on one side of the coil case in the axial direction, the ring shaped body of the coil case includes a bottom, the bottom of the coil case is made of the resin hardened soft magnetic material, and the bottom of the coil case corresponds to a circumference of the coil body having a ring shape.

12. The method according to claim 11, wherein the ring shaped body of the coil case further includes a pair of sidewalls, and each sidewall is disposed on one edge of the bottom of the coil case so that the sidewalls and the bottom are integrally made of the resin hardened soft magnetic material.

13. The method according to claim 11, further comprising:

a reinforcing frame made of material having a Young's modulus larger than that of the resin hardened soft magnetic material of the coil case, wherein the reinforcing frame is disposed on the bottom of the coil case.

14. A card type wireless device comprising:
a communication module having an antenna coil, a transmitting/receiving circuit connecting to the antenna coil, and a substrate; and
a card type casing, wherein the antenna coil includes:
   an air-core type flat coil body having a thickness in an axial direction of the coil body; and
   a coil support member disposed between the coil body and a substrate as a mounting object of the antenna coil so that the coil body is supported on a surface of the substrate,
the thickness of the coil body is smaller than a radius of a circle, an area of which is equal to an area of a region surrounded with an outline of a projected coil body, the projected coil body provided by projecting the coil body on a projection plane perpendicular to an axial direction of the coil body,
the coil support member is made of resin hardened soft magnetic material,
the coil body includes an axis, which coincides with a normal line of the substrate, and
the card type casing accommodates the communication module in such a manner that a thickness direction of the substrate coincides with a thickness direction of the card type casing.

15. The card type wireless device according to claim 14, wherein
the resin hardened soft magnetic material is made of soft ferrite powder.

16. The card type wireless device according to claim 14, wherein
the coil support member includes a ring portion disposed along with a circumferential direction of the coil body, and
the ring portion is made of the resin hardened soft magnetic material.

17. The card type wireless device according to claim 14, wherein
the coil support member is a coil case having a coil accommodation space for accommodating the coil body therein,
the coil case includes a ring shaped body corresponding to the coil body, and
the coil case includes a part, which is made of the resin hardened soft magnetic material.

18. The card type wireless device according to claim 17, wherein
the coil accommodation space is a groove with an opening, which is disposed on one side of the coil case in the axial direction,
the ring shaped body of the coil case includes a bottom,
the bottom of the coil case is made of the resin hardened soft magnetic material, and
the bottom of the coil case corresponds to a circumference of the coil body having a ring shape.

19. The card type wireless device according to claim 18, wherein
the ring shaped body of the coil case further includes a pair of sidewalls, and
each sidewall is disposed on one edge of the bottom of the coil case so that the sidewalls and the bottom are integrally made of the resin hardened soft magnetic material.

20. The card type wireless device according to claim 18, further comprising:
a reinforcing frame made of material having a Young's modulus larger than that of the resin hardened soft magnetic material of the coil case,
wherein the reinforcing frame is disposed on the bottom of the coil case.

21. The card type wireless device according to claim 19, further comprising:
a reinforcing frame made of material having a Young's modulus larger than that of the resin hardened soft magnetic material of the coil case,
wherein the reinforcing frame is disposed on the bottom and at least one of the sidewalls of the coil case.

22. The card type wireless device according to claim 16, wherein
the coil support member covers the region surrounded with the outline of the projected coil body, and
the coil support member is made of a sheet of the resin hardened soft magnetic material.

* * * * *